United States Patent Office 3,454,599
Patented July 8, 1969

3,454,599
1-HYDROXYMETHYL-3-OXO-2-OXA-STEROIDS
Oskar Jeger, Zollikerberg/Zurich, Hans Ueli Wehrli, Schaffhausen, and Kurt Schaffner, Zurich, Switzerland, assignors to Ciba Corporation, New York, N.Y., a corporation of Delaware
No Drawing. Filed Nov. 23, 1966, Ser. No. 596,454
Claims priority, application Switzerland, Dec. 6, 1965, 16,819/65
Int. Cl. C07d *101/00;* C07c *169/20;* B01j *1/10*
U.S. Cl. 260—343.2           3 Claims

ABSTRACT OF THE DISCLOSURE 3-oxo-2-oxa-1-hydroxymethyl-steroids, particularly androstanes having antiandrogenic and antiestrogenic properties and inhibiting the hypophysis.

---

The present invention relates to the manufacture of a new group of steroids, namely the 3-oxo-2-oxa-1-hydroxymethylsteroids, and of their esters and ethers.

The present invention is based on the unexpected observation that these compounds or their esters are obtained by irradiating 3 - oxo-2-RO-1-hydroxysteroids—where R represents hydrogen or the radical of a lower aliphatic carboxylic acid, especially of a lower alkanecarboxylic acid, in the first place acetic or propionic acid—with ultraviolet light.

The process of this invention may be represented, for example, by the following simplified partial formulae:

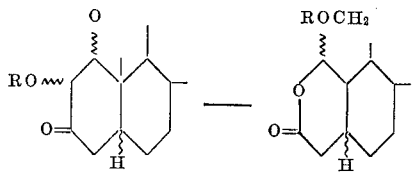

where R represents, for example, a hydrogen atom or an acetyl radical.

The starting materials to be used in the new process belong preferably to the androstane, pregnane, cholane, cholestane, spirostane or cardanolide series. Their ring system and side chain may contain one or several substituents, for example free or functionally modified hydroxyl or keto groups, for example acyloxy groups of carboxylic acids containing up to 20 carbon atoms, such as acetoxy, propionoxy or benzoyloxy groups, lower alkoxy such as methoxy or ethoxy groups, the tetrahydropyranyloxy group or lower alkylenedioxy such as ethylenedioxy or 1,2- or 1,3-propylenedioxy groups; also lower aliphatic hydrocarbon radicals, for example lower alkyl, alkylene, alkenyl or alkinyl groups, such as methyl, ethyl, propyl, methylene, vinyl, allyl, ethinyl or propargyl groups, or halogen such as fluorine or chlorine atoms. The starting materials may also contain one or several double bonds.

The acyloxy group in position 2 of the starting materials contains as acyl radical in the first place the radical of a lower alkanecarboxylic acid, for example the acetic or propionic acid.

Preferred starting materials are those of the formula

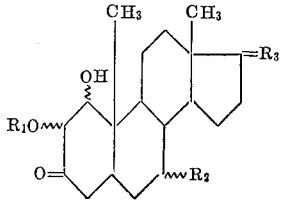

where $R_1$ stands for a hydrogen atom or a lower alkanoyl, especially the acetyl radical, $R_2$ for a hydrogen atom or an α-positioned lower alkyl group, and $R_3$ for an oxo or lower alkylenedioxy group or for a free, esterified or etherified β-positioned hydroxyl group together with a hydrogen atom or with a lower aliphatic hydrocarbon radical.

The irradiation according to this invention is advantageously carried out in an organic solvent, for example in an aliphatic, cycloaliphatic or aromatic hydrocarbon such as pentane, hexane, cyclohexane, methylcyclohexane, benzene or toluene, or in an alcohol such as ethanol or tertiary butanol and/or in an ether such as diethyl ether or dioxan, at room temperature or with cooling or heating, in the presence or absence of basic agents and/or of inert gases.

The irradiation is performed with artificial or strong natural light. A particularly suitable source of light is a mercury vapour low-pressure or high-pressure burner.

Any ester or protective groups, such as ketals, present in the resulting 2-oxa compounds may, if desired, be split hydrolytically and free hydroxyl groups may be oxidized to oxo groups. On the other hand, process products containing free hydroxyl groups may be converted in known manner into their esters or ethers, for example by acylation with carboxylic acid anhydrides or carboxylic acid halides or by reaction with dihydropyran.

The starting materials, which may contain a possibly esterified hydroxyl group in position 2, are obtained, for example, when a $\Delta^1$-3-oxosteroid is hydroxylated in position 1,2 with hydrogen peroxide in the presence of osmium tetroxide and, if desired, the resulting dihydroxy compound is reacted with a reactive functional derivative of a lower aliphatic carboxylic acid in the presence of a base, for example pyridine.

The $\Delta^1$-3-oxosteroids of the 5β series, which in the past could be synthesized only with considerable difficulty, are advantageously prepared from the 3-oxo-4,5-oxidosteroids by treatment with a strong acid, especially sulfuric acid, hydrogenation of the resulting 2α-hydroxy-3-oxo-$\Delta^4$-steroids to the 2-hydroxy-3-oxo-5β-steroids, conversion of the 2-hydroxyl group into the mesyloxy group and elimination of this radical, for example by irradiation, heating in a base or with a lithium salt of dimethylformamide.

The product of the present process are pharmacologically active substances or valuable intermediates for their manufacture. Thus, for example, the process products of the androstane series have an antiandrogenic and antioestrogenic effect and inhibit the hypophysis. A resulting compound of the pregnane cholane, cholestane, spirostane or cardanolide series may, if desired, be converted in known manner into the pharmacologically active compounds, for example by way of acylolysis, oxidation and/or microbiological methods.

The following examples illustrate the invention without in any way restricting its scope.

Example 1

A mixture of 3 g. of 3-oxo-17β-acetoxy-$\Delta^1$-5α-androstene, 120 ml. of ether, 0.3 g. of osmium tetroxide and 8 ml. of hydrogen peroxide is stirred for 32 hours at room temperature. The reaction solution is diluted with ether and successively washed with aqueous solutions of potassium iodide and sodium thiosulfate and then with water. The organic phase is evaporated under vacuum and the residue taken up in ether and filtered through silica gel. The eluate is evaporated and the residue recrystallized from acetone+petroleum ether. The resulting 1,2-dihydroxy-3-oxo-17-acetoxy-5α-androstane (2.5 g.) melts at 191–193° C. Optical rotation $[\alpha]_D = +34°$ (c.=0.26). Its infrared spectrum contains bands at 3570–3490, 1715 and 1255 cm.$^{-1}$.

A mixture of 3 g. of 1,2-dihydroxy-3-oxo-17-acetoxy-5α-androstane and 200 ml. of absolute benzene is irradiated for 6 hours at room temperature in a quartz vessel filled with nitrogen and containing a mercury vapour high-pressure burner. The batch is evaporated under vacuum and the residue chromatographed on silica gel. A 1:1-mixture of acetone and petroleum ether elutes 2.1 g. of crystalline 1-hydroxymethyl-3-oxo-17-acetoxy-2-oxa-5α-androstane which melts at 202° C. after having been reprecipitated from acetone+petroleum ether. Optical rotation $[\alpha]_D = +27°$ (c.=0.66). Its infrared spectrum contains bands at 3600, 1720 (broad) and 1255 cm.$^{-1}$.

A mixture of 1.177 g. of 1-hydroxymethyl-3-oxo-17-acetoxy-2-oxa-5α-androstane and 100 ml. of a 1:1-solution of acetic anhydride+pyridine is kept overnight at room temperature, then evaporated under vacuum and the residue is taken up in methylenechloride. The batch is filtered through alumina (activity III) and the eluate is recrystallized from acetone+hexane. 1-acetoxymethyl-3-oxo-17-acetoxy-2-oxa-5α-androstane melts at 149–151° C. Optical rotation $[\alpha]_D = -12°$ (c.=0.72). Its infrared spectrum contains bands at 1725 (broad) and 1255 cm.$^{-1}$.

Example 2

A mixture of 140 mg. of 1β,2β-dihydroxy-3-oxo-17β-5β-acetoxyandrostane and 50 ml. of absolute benzene is irradiated for 3½ hours at room temperature in a quartz vessel containing a mercury vapour high-pressure burner. The reaction product is evaporated under vacuum, and the residue is taken up in ethyl acetate and filtered through silica gel; the filtrate is evaporated and the residue recrystallized from acetone+petroleum ether, to yield 70 mg. of 1-hydroxymethyl-3-oxo-17-acetoxy-2-oxa-5β-androstane melting at 193 to 194° C. Optical rotation $[\alpha] = +76°$ (c.=0.52). Its infrared spectrum contains bands at 3600, 1725 (broad) and 1250 cm.$^{-1}$.

The starting material used in this example may be prepared, for example, in the following manner:

10 grams of 3-oxo-4β,5-oxido-17β-acetoxyandrostane in 250 ml. of acetone together with a mixture of 6 ml. of concentrated sulfuric acid and 12 ml. of water are boiled for 1 hour. The reaction mixture is diluted with ethyl acetate, washed with saturated aqueous sodium chloride solution until neutral, dried and evaporated. The residue is taken up in methylenechloride, filtered through neutral alumina (activity III) and chromatographed on silica gel. Elution is then performed with a 4:1-solution of benzene and ethyl acetate, the eluate is evaporated and there are obtained 4.5 g. of 2α-hydroxy-3-oxo-17-acetoxy-Δ⁴-androstene which, after recrystallization from acetone+petroleum ether, melts at 216 to 218° C. Optical rotation $[\alpha]_D = +81°$ (c.=0.57). Infrared bands at 3480 (broad), 1725, 1675, 1620, 1255 cm.$^{-1}$. Ultraviolet band at $\lambda_{max.} = 243$ mμ (ε=12,700).

1 gram of this product is hydrogenated in 50 ml. of methanol of 90% strength previously saturated with sodium bicarbonate, and 10 ml. of dioxan in the presence of 500 mg. of palladium charcoal of 5% strength. When one molecular equivalent of hydrogen has been absorbed, the catalyst is filtered off and the filtrate acidified with glacial acetic acid and evaporated under vacuum. The residue is taken up in methylenechloride, filtered through neutral alumina (activity III) and chromatographed on silica gel. A 4:1-mixture of benzene and ethyl acetate elutes 2α-hydroxy-3-oxo-17β-acetoxy-5β-androstane which melts at 117–119° C. after recrystallization from acetone+petroleum ether. Infrared bands at 3490, 1720 and 1255 cm.$^{-1}$.

1 gram of the resulting compound in 10 ml. of pyridine is mixed with 1 ml. of mesylchloride and kept overnight at room temperature. The batch is diluted with ethyl acetate, washed successively with sodium bicarbonate solution, water, dilute hydrochloride acid and once more with water; the organic phase is evaporated, and the residue taken up in methylenechloride, filtered through neutral alumina and evaporated. The residue is recrystallized from acetone+petroleum ether, to yield 760 mg. of 2α-mesyloxy-3-oxo-17β-acetoxy-5β-androstane which decomposes above 170° C. Optical rotation $[\alpha]_D = +28.9°$ (c.=0.71). Infrared bands at 1725, 1340, 1255, 1170 and 965 cm.$^{-1}$.

300 milligrams of the above mesylate are irradiated for 5 hours at room temperature in 50 ml. of absolute benzene in a quartz vessel containing a mercury vapour high-pressure burner. The batch is immediately filtered through neutral alumina (activity III), rinsed with methylenechloride and evaporated, to yield 210 mg. of 3-oxo-17β-acetoxy-Δ¹-5β-androstane which, after recrystallization from acetone+petroleum ether, melts at 137° C. Optical rotation $[\alpha]_D = +143°$ (c.=0.52). Infrared bands at 1725, 1680 and 1255 cm.$^{-1}$. Ultraviolet absorbtion at $\lambda_{max.} = 233$ mμ (ε=9200).

100 milligrams of the above compound in 10 ml. of ether are mixed, while being stirred, with 10 mg. of osmium tetroxide and 0.3 ml. of hydrogen peroxide; the reaction solution is stirred for 1 day at room temperature in the dark, then diluted with ethyl acetate and washed with potassium iodide solution, sodium thiosulfate solution and water, evaporated, and the residue is taken up in ether, filtered through silica gel, and the evaporated eluate is reprecipitated from acetone+petroleum ether. The resulting 1β,2β-dihydroxy-3-oxo-17β-acetoxy-5β-androstane melts at 174–177° C. Optical rotation $$[\alpha]_D = +19.3°$$

(c.=0.02). Infrared bands at 3600, 3480, 1720 and 1255 cm.$^{-1}$.

What is claimed is:
1. A compound of the formula

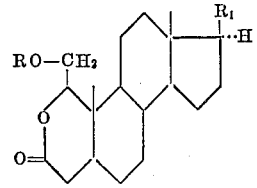

wherein R is a member selected from the group consisting of hydrogen and lower alkanoyl and R₁ is a member selected from the group consisting of hydroxy and O-lower alkanoyl.

2. 1 - hydroxymethyl-3-oxo-17β-acetoxy-2-oxa-androstane.

3. 1-acetoxymethyl - 3 - oxo-17β-acetoxy-2-oxa-androstane.

References Cited

Eggart et al.: Helv. Chim, Acta., vol. 50(3) (1967), pp. 985–8.

JAMES A. PATTEN, *Primary Examiner.*

U.S. Cl. X.R.

204—158; 260—239.55, 340.7, 340.9, 397.4, 999